April 7, 1936.   C. C. MULNEAUX   2,036,230
WINDOW HEATER FOR MOTOR VEHICLES
Filed Nov. 27, 1933
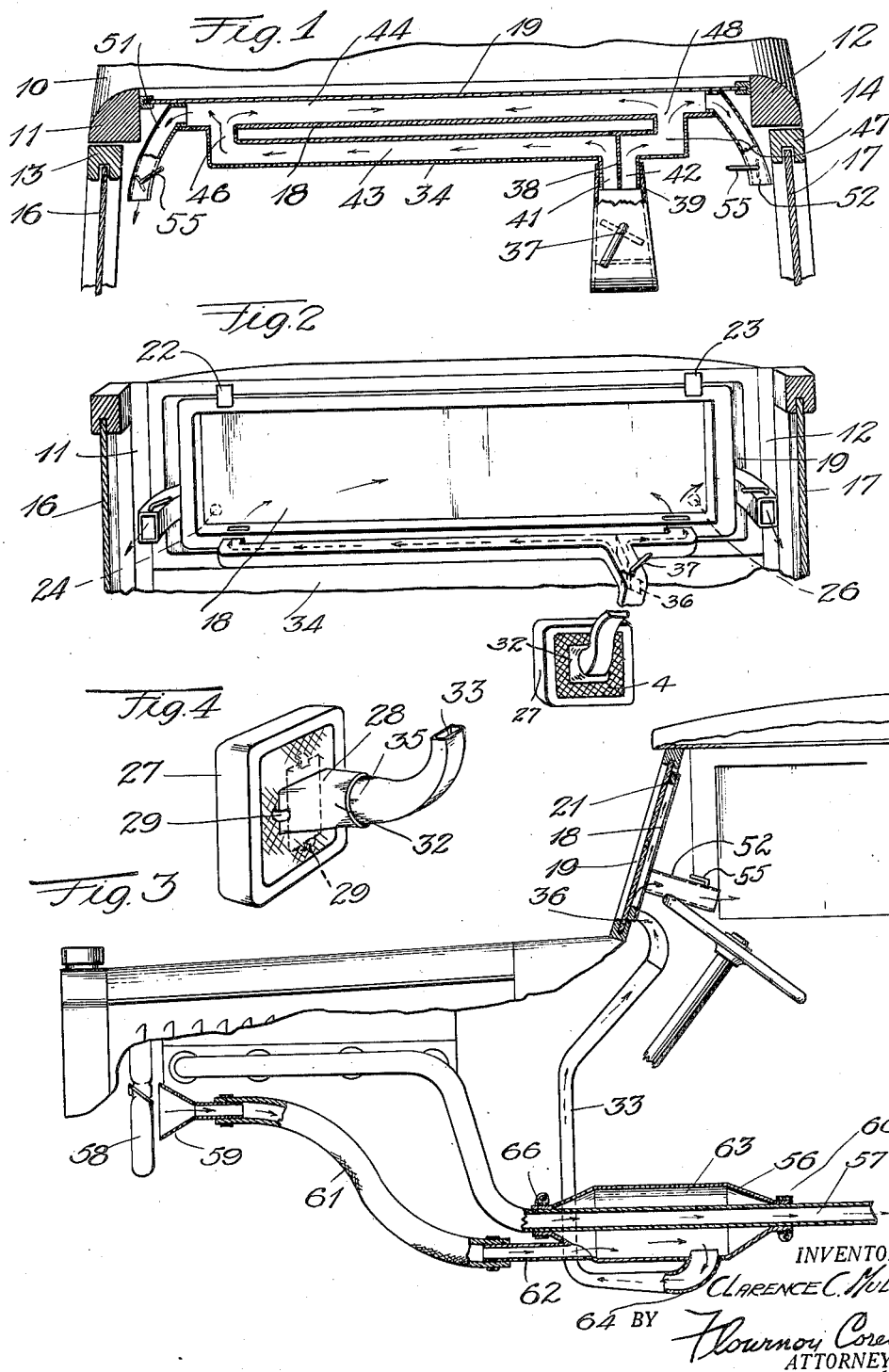

Patented Apr. 7, 1936

2,036,230

UNITED STATES PATENT OFFICE 2,036,230

WINDOW HEATER FOR MOTOR VEHICLES

Clarence C. Mulneaux, Cedar Rapids, Iowa

Application November 27, 1933, Serial No. 699,888

5 Claims. (Cl. 20—40.5)

The present invention relates to heaters for motor vehicles and more particularly to devices for collecting heated air created from the heat of the internal combustion engine or other power source and conducting it to and passing it over the windshield and side windows of the motor vehicle.

While devices of this general character have been proposed, such devices have not met with entire success because the heated air did not reach the entire windshield and was not directed in sufficient quantities onto the windows to melt snow and ice which collected thereon.

I have devised a means of conducting relatively large quantities of heated air to the windows of a motor vehicle and causing the air to be distributed evenly over the entire inner surface of the windshield and to be directed to the side windows to keep both windshield and side windows free of ice and snow.

A general object of my invention is to provide means for keeping the windows of a motor vehicle free of ice and snow.

A more specific object of my invention is to provide a device of the above character which will distribute heated air to the entire windshield.

Another object of my invention is to provide means for conducting heated air to the side windows as well as the windshield.

Another object of my invention is to provide a recirculating system whereby air is heated within the motor vehicle, is conducted to and passes over the windshield, is discharged onto the side windows, and then flows back to the heating device where it is reheated and recirculated.

Another object of my invention is to provide hot air collecting means for collecting heated air from heaters which have already been installed in a motor vehicle and conducting this heated air to the windshield and side windows.

Another object of my invention is to furnish means for controlling the quantity of hot air which is conducted to the windows of the motor vehicle.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims without departing from the spirit of the invention.

In said drawing:

Figure 1 is a plan view in section and in more or less diagrammatic relation of the windshield and side windows of a motor vehicle to which a device constructed according to my invention has been applied.

Figure 2 is a view in perspective, from inside a motor vehicle, of the windshield and side windows of a vehicle, to which windows a heater constructed according to my invention has been applied. Parts of the vehicle are shown in section and other parts are broken away to better illustrate the device.

Figure 3 is a view, partly in side elevation and partly in section of the front end of a motor vehicle to which a modified form of my heating device has been applied according to another embodiment of my invention, and Figure 4 is a view in perspective of a hot water heater to which the intake of my window heating device has been connected.

A device constructed according to my invention is adapted for use with vehicles such as an automobile, truck, bus, locomotive, rail car, street car or in aircraft, but in the present instance, I have shown it in connection with the conventional automobile. The cowl of the motor vehicle is indicated at 10 and the front corner posts are indicated in section in Figure 1 at 11 and 12, and in full lines by the same numerals in Figure 2. These motor vehicles are usually provided with permanent door frames such as those indicated at 13 and 14 or folding door frames such as used in connection with a convertible type of vehicle.

Windows 16 and 17 are adapted to slide up and down in the door frames 13 and 14, or if use of the device is contemplated with an open vehicle, side curtains are located at the positions now indicated by the glasses 16 and 17.

In practising my invention, I provide a second sheet of glass 18 which is of almost the same shape and size as the usual windshield 19 and this second glass is spaced from the windshield 19 by means of a substantially rectangular pad 21 of felt or the like. The glass 18 is preferably held at the top by means of hinge members 22 and 23 which permit the glass to be swung away from the windshield so that the windshield may be cleaned. The glass is preferably held against the windshield by means of suction cups 24 and 26 which are fastened to the glass 18 and which engage the windshield 19 through the action of atmospheric pressure in the usual manner of such vacuum cups. Of course, any other suitable fastening means may be employed.

It is apparent that, by use of the glass 18 in connection with the windshield 19, an enclosed space 44 is supplied. If heated air is introduced into this space the glass windshield 19 becomes, on continued application of heat, sufficiently warm to melt any snow or ice which may strike the windshield. There are at least two sources of heat for heating the windshield by heated air. One source of heat, which has been more or less overlooked, is that eminating from the hot water heater used in heating the interior of the motor vehicle. In one embodiment of my invention shown in Figures 1, 2, and 4, I have provided means for utilizing this heat.

In utilizing the hot water heater such as the heater indicated at 27 I preferably provide an inlet conduit 28 having a pair of clip members 29 adapted to engage the face of the honeycomb portion of the heater. These clips are merely a pair of hook members joined together inside of the inlet conduit by means of a spring 31. In applying the inlet conduit to the heater, the hook members are engaged within the openings in the honeycomb 0 of the heater and the spring 31 causes the hooks to tightly engage the honeycomb to hold the inlet conduit in place against the face of the heater. In this connection, I provide a rotatable connection for the inlet conduit by enlarging it to a cylindrical sleeve as indicated at 32. The lower portion of the conduit 33, which is used to conduct hot air to the windshield, is also provided with a sleeve 35 adapted to fit within the sleeve 32 of the inlet conduit. It is apparent then that the inlet conduit 28 may be rotated so that its rectangular end may be placed in a vertical or horizontal position against the face of the hot water heater as desired, so that the inlet conduit will not interfere with the shutter commonly used for directing heated air after it passes through the hot water heater.

The upper portion of the conduit 33 is the same as that shown in Figure 3 and, as may be understood by inspection of the drawings, this conduit leads upwardly beneath the dash and up over the dash to a manifold indicated at 34. Connection between the manifold 34 and conduit 33 is had by a bent section of conduit preferably rectangular in construction and indicated at 36. I preferably provide a butterfly valve 37 in the conduit 36 for the purpose of controlling the flow of hot air into the manifold 34.

The manifold 34 is provided with a partition 38 just inside the manifold inlet 39 and this partition is placed a little to one side of the center line of the manifold inlet conduit so that the channel 41 is slightly larger than the channel 42. Air entering the manifold at 41 passes on through the channel 43, in the manifold and into the space 44 between the windshield 19 and glass 18. From there the air is exhausted from the space 44 through the outlet conduit indicated at 46. Another part of the air entering the manifold inlet 39 flows through the manifold channel 47 and enters the space 44 at 48. The channel 41 is made larger than the channel 42 in order to compensate for the greater distance the air must flow in transit through the channel 43. The result is that a slightly greater volume of air enters at 46 for a given time than passes through the channel 47.

The large volume of heated air flowing into the space 44 flows over the inner face of the windshield and melts any snow and ice which may have collected on the outer surface thereof. After the heated air has passed through the space 44 it passes out through discharge conduits 51 and 52 and is thus discharged. It will be noted that the outlets of these conduits are adjacent to the inner faces of the respective window glasses 16 and 17 and thus the direction of flow of air leaving the outlet conduit is parallel to and over the inner faces of the glasses. It is apparent, therefore, that the heated air will warm these glasses as well and cause the heated glass to melt snow or ice which may tend to form on the outer surface of these glasses. The air, after it has warmed the glasses 16 and 17, of course, flows into the interior of the car where it may be drawn into the hot water heater and reheated and recirculated. By means of my invention large quantities of heated air may be directed across the windshield to keep it free of snow and ice and the heated air is also directed across the inner faces of the side windows to keep them free as well.

It is apparent that any suitable source of hot air may be utilized for furnishing heated air to the windshield. In Figure 3 I have shown a means of furnishing hot air to the windshield which may be used if a hot water heater is not available. In this embodiment of the invention I place a jacket 56 around the exhaust pipe 57. Air from the fan 58 is collected by the horn 59, and is driven through the flexible conduit 61 and inlet pipe 62, and into the space 63 within the jacket 56. The air passes over the heated outer surface of the exhaust pipe and the inner face of the jacket 56 and is heated thereby. The pressure of air from the horn 59 causes the heated air to pass out through the outlet 64, up through the conduit 33, and into the space 44 between the windshield 19 and the glass 18. Butterfly valves 55 in discharge conduits 51 and 52 may be employed to control the discharge flow of heated air.

The jacket 56 is split longitudinally in order to permit it to be fastened onto the exhaust pipe 57 without disassembling the exhaust pipe. The two halves of the jacket 56 are held together by means of clamp members 66. The ends of the jacket 56 may be spread so as to accommodate any of the conventional exhaust pipes. The action of the device shown in Figure 3 is substantially the same as the device shown in Figures 1, 2, and 4, except that the air is not recirculated.

It is apparent that devices constructed according to my invention may be applied to all makes of motor vehicles, to rail cars, air-craft, locomotives and the like wherever there is danger of the windshield and windows becoming covered with snow and ice.

It is apparent also that my invention is susceptible to a wide variation of modifications. Such modifications may be made without departing from the spirit and scope of the invention as set forth in the appended claims.

I claim as my invention:

1. In a window heater, means for conducting heated air to the inner face of the windshield, and other means for directing the air after it has passed over the inner face of the windshield, to the inner faces of the side windows of the motor vehicle.

2. In a heater of the class described, a windshield, a transparent plate spaced apart from the windshield and having means associated therewith to form an enclosure with the windshield, a heater, a conduit adapted to conduct hot air from a heater to a manifold, a manifold for conducting the heated air to the space between the windshield and the glass, and discharge conduits communicating with the space between the glass and the windshield and having their discharge openings located at points adjacent the side windows of the vehicle, whereby heated air from the space between glass and windshield is directed onto the side windows of the vehicle.

3. In a windshield heater of the class described, means for forming an enclosed space on the rear face of the windshield, a heater, means for conducting hot air from the heater to the enclosed space, and discharge conduits communicating with the enclosed space adapted to direct air therefrom onto the side windows of the motor vehicle.

4. In a heater for motor vehicles, a glass adapted to be fastened to the windshield and means for spacing the glass from the windshield to form an enclosure between the windshield and the glass, an inlet conduit for conducting hot air into the enclosure between the windshield and glass, valve means for controlling the flow of air through the inlet conduit, exhaust conduits communicating with the space between the glass and the windshield and arranged to cause the exhaust air to pass over the inner faces of the side windows, and valves in these last named conduits to control the flow of exhaust air as desired.

5. In combination with a vehicle and a vehicle heater, the vehicle having a windshield and side windows, an inlet conduit adapted to be clamped to the face of the heater, a conduit engaged to the inlet conduit and leading upwardly to the windshield, the inlet conduit being rotatably engaged to the second named conduit to permit it to be engaged to the heater in a plurality of positions as desired, a transparent plate, and means at the edges of the plate for holding it in spaced relation to the windshield and for forming an enclosure between the plate and the windshield, a manifold engaged to the upper end of the second named conduit and arranged to provide conduits leading from the second named conduit into the space between the plate and the windshield, and discharge conduits, one at each end of the plate, disposed to conduct air from the space between the plate and windshield to the side windows of the vehicle.

CLARENCE C. MULNEAUX.